United States Patent
Mishra

(10) Patent No.: US 11,509,723 B1
(45) Date of Patent: Nov. 22, 2022

(54) SYSTEMS AND METHODS FOR DYNAMIC AND EFFICIENT DEVICE MONITORING VIA A NETWORK

(71) Applicant: Verizon Patent and Licensing Inc., Basking Ridge, NJ (US)

(72) Inventor: Sambit Mishra, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/527,014

(22) Filed: Nov. 15, 2021

(51) Int. Cl.
*H04L 67/12* (2022.01)
*G16Y 40/10* (2020.01)

(52) U.S. Cl.
CPC ............. *H04L 67/12* (2013.01); *G16Y 40/10* (2020.01)

(58) Field of Classification Search
CPC ................................ H04L 67/12; G16Y 40/10
See application file for complete search history.

(56) References Cited

U.S. PATENT DOCUMENTS

| 2005/0131652 | A1* | 6/2005 | Corwin | G08C 17/00 702/127 |
| 2018/0091391 | A1* | 3/2018 | Turow | H04L 41/06 |
| 2020/0244741 | A1* | 7/2020 | Di Girolamo | G06F 9/5011 |

* cited by examiner

*Primary Examiner* — Normin Abedin

(57) ABSTRACT

A system described herein may provide a technique for the monitoring of one or more devices, such as Internet of Things ("IoT") devices or other suitable types of devices, via one or more networks. The system may maintain readings associated with the IoT devices, and may identify a demand for a set of readings from a particular IoT device. The system may output a request to the particular IoT device. The request may indicate a maximum data size for a response to the request, as well as an indication of the latest time associated with readings received from the particular IoT device. The IoT device may respond with readings that were collected after the indicated latest time. The response may be restricted to the maximum data size. As such, the IoT device may refrain from providing a full set of readings that were collected after the indicated latest time.

20 Claims, 10 Drawing Sheets

SYSTEMS AND METHODS FOR DYNAMIC AND EFFICIENT DEVICE MONITORING VIA A NETWORK

BACKGROUND

Internet of Things ("IoT") devices or other types of devices, may include sensors or other input devices via which the IoT devices may collect, record, measure, etc. data over time. IoT devices may include a communication interface which the IoT devices may provide the collected, recorded, measured, etc. data to a server device over a network, such as a wireless network.

DETAILED DESCRIPTION OF EXAMPLE EMBODIMENTS

Figure 1:
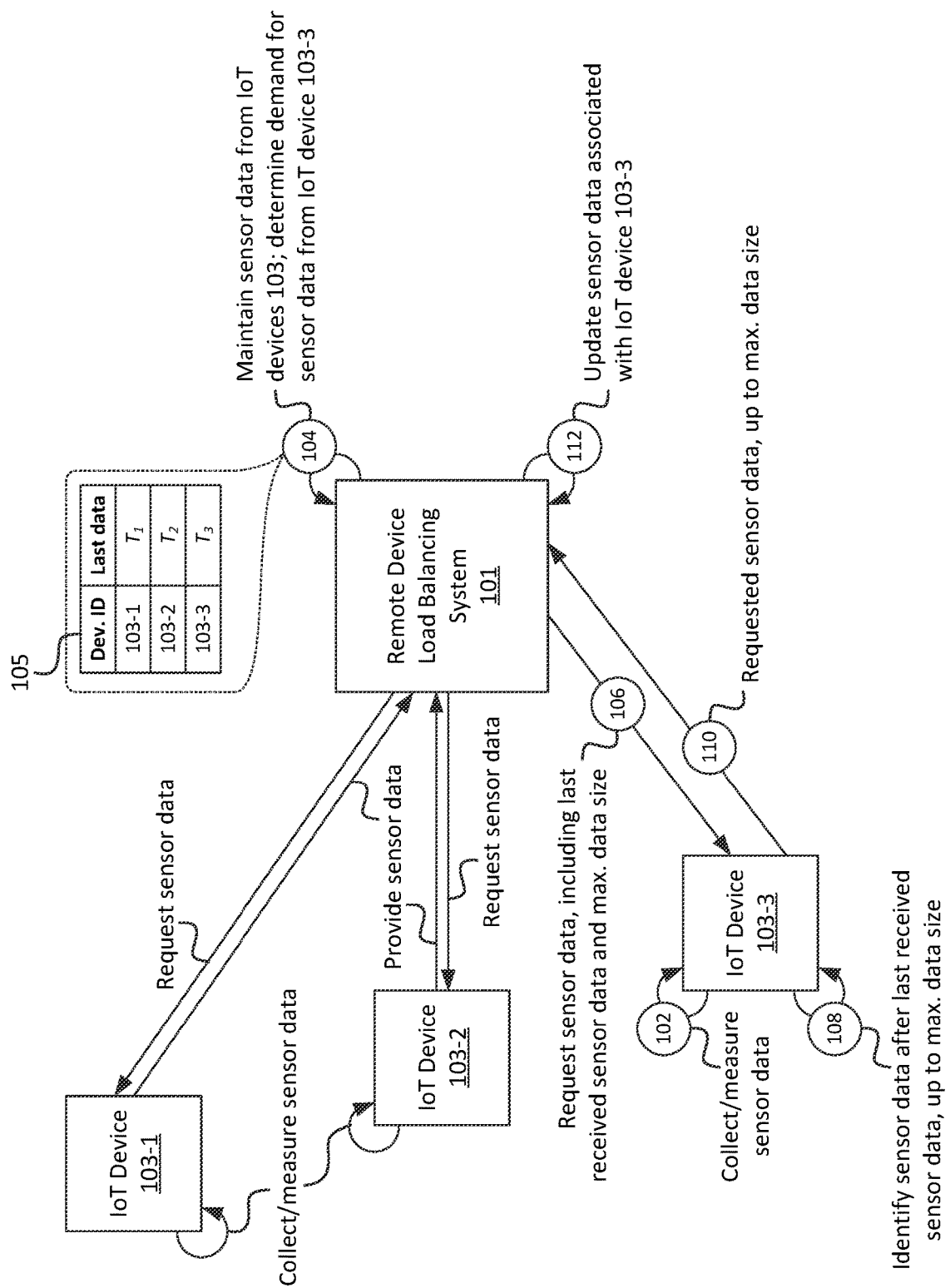
FIG. 1 illustrates an example overview of one or more embodiments described herein.

The following detailed description refers to the accompanying drawings. The same reference numbers in different drawings may identify the same or similar elements.

Embodiments described herein provide for the efficient and dynamic monitoring of devices, such as IoT devices or other suitable types of devices, via one or more networks. An IoT device may include one or more sensors or other input devices via which the IoT device may collect, record, measure, etc. (referred to herein simply as "collect") data over time. Such data may include sensor data relating to temperature, atmospheric pressure, acceleration or other movement, light, radio frequency ("RF") signal conditions, telemetry data of one or more vehicles or other devices or systems, and/or other types of measurable data. IoT devices may include a communication interface which the IoT devices may provide the collected sensor data to a server device over a network, such as a wireless network. Such communication interfaces may include one or more wireless radios or other suitable devices or components. In some embodiments, IoT devices may include, may be implemented by, and/or may be communicatively coupled to a User Equipment ("UE"), such as a mobile phone, a tablet, etc. In some embodiments, IoT devices may be integrated in or communicatively coupled to an autonomous or semi-autonomous vehicle, drone, or other suitable device or system. While examples are provided herein in the context of IoT devices, other types of devices may be used to implement similar concepts in some embodiments. Further, while examples described herein are provided in the context of sensor data that is collected and reported by IoT devices, similar concepts may apply to other types of communications, such as status messages, connection error messages, "keepalive" or "heartbeat" messages, etc.

The monitoring of sensor data collected by IoT devices may be relatively resource-intensive for servers or other types of devices that receive sensor data collected by IoT devices and/or for networks via which such sensor data is sent to the servers from the IoT devices. For example, a given server may monitor thousands or millions of IoT devices. A situation in which a relatively large amount of IoT devices send sensor data to the server within a relatively short timeframe may exceed the processing, storage, and/or network capacity of the server and/or one or more networks. Such a situation may result in delayed processing or recording of such data, data loss, server hardware failure, and/or other issues. Embodiments described herein allow for a load balancing system to dynamically determine which IoT devices should output collected sensor data, when the IoT devices should output collected sensor data, and an amount of sensor data that such IoT devices should output at a given time (e.g., quantity of readings, maximum data size, maximum quantity of packets, etc.). In this manner, resources (e.g., processor resources, network resources, etc.) may be utilized effectively while monitoring IoT devices in accordance with resource-based factors as well as one or more other factors, such as class or priority of IoT devices, types of data associated with IoT devices, a determined increase in demand for data from a given IoT device (e.g., increased monitoring when data from the IoT device exceeds a threshold, such as an excessive temperature or acceleration), and/or other factors.

As shown in FIG. 1, for example, Remote Device Load Balancing System ("RDLBS") 101 may monitor a set of IoT devices 103-1, 103-2, and 103-3. The monitoring may include requesting sensor data from IoT devices 103-1, 103-2, and 103-3, and receiving sensor data in response to the requests. RDLBS 101 may store the received sensor data and/or may forward the received sensor data to one or more other devices or systems. In some embodiments, IoT devices 103 may output sensor data to one or more devices or systems in addition to, or in lieu of, RDLBS 101. For example, in some embodiments, RDLBS 101 may receive an indication that sensor data was provided by a given IoT device 103 to an application server, but RDLBS 101 may not receive the sensor data itself.

RDLBS 101 may output requests to IoT devices 103 via an application programming interface ("API"), one or more networks, one or more communication aggregation systems, or some other suitable communication pathway. RDLBS 101 may output the requests to different IoT devices 103 at different intervals and/or at different times. As one example, IoT device 103-3 may collect (at 102) sensor data over time. As noted above, such sensor data may be collected by IoT device 103-3 via one or more sensors or other suitable devices or components associated with (e.g., integrated in or communicatively coupled to) IoT device 103-3. Such sensors may include one or more thermometers, barometers, accelerometers, photosensors, haptic sensors, or other suitable sensors. In some embodiments, in addition to or in lieu of sensor data, IoT device 103-3 may collect or compute other types of data over time, such as RF metrics, throughput metrics, latency metrics, or the like. Examples below that refer to the collection, monitoring, outputting, etc. of "sensor data," may additionally or alternatively include the collection, monitoring, outputting, etc. of other types of data.

The collected (at 102) sensor data may include, may be annotated with, etc. timestamps or other indicators of when the data was collected. RDLBS 101 may further maintain (at 104) information associated with each IoT device 103, indicating when the last sensor data for each IoT device 103 was collected. For example, RDLBS 101 may store data structure 105 and/or some other suitable representation of some or all of the sensor data received from IoT devices 103-1, 103-2, and 103-3. For example, data structure 105 may include an identifier of each respective IoT device 103 (e.g., a Media Access Control ("MAC") address, an Internet Protocol ("IP") address, a Subscription Permanent Identifier ("SUPI"), a Globally Unique Temporary Identifier ("GUTI"), an International Mobile Station Equipment Identity ("WEI") value, an International Mobile Subscriber Identity ("IMSI") value, etc.), as well as an indication of the latest (e.g., last, most recent, etc.) sensor data associated with each IoT device 103. For example, data structure 105 may indicate that the latest sensor data associated with IoT device 103-1 was collected (e.g., collected by IoT device 103-1) at a first time $T_1$, that the latest sensor data associated with IoT device 103-2 was collected at a second time $T_2$, and that the latest sensor data associated with IoT device 103-3 was collected at a third time $T_3$.

In some embodiments, data structure 105 may include other information, such as raw values and/or other representations of the sensor data received from IoT devices 103. In some embodiments, data structure 105 may include attributes, features, parameters, etc. associated with IoT devices 103. Such attributes, features, parameters, etc. may include a make and/or model of IoT device 103, type(s) of sensor(s) associated with IoT device 103, processor type clock speed of IoT device 103, memory capacity of IoT device 103, and/or other attributes, features, parameters, etc.

In some embodiments, RDLBS 101 may, at some time, determine (at 104) a demand for sensor data from IoT device 103-3. For example, RDLBS 101 may determine that a threshold amount of time has passed since receiving the last sensor data associated with IoT device 103-3 (e.g., as collected at time $T_3$). As described below, RDLBS 101 may determine the demand for sensor data from IoT device 103-3 based on one or more other factors. For example, RDLBS 101 may determine that IoT device 103-3 is a higher priority device than IoT devices 103-1 and 103-2 (e.g., associated with a particular subscription level, associated with a particular group or enterprise, associated with a first responder entity, etc.), and that a request should therefore be sent to IoT device 103-3 before IoT device 103-1 or IoT device 103-2 (and/or that IoT device 103-3 should be monitored more frequently or in some other prioritized fashion with respect to IoT device 103-1 and IoT device 103-2). In some embodiments, each IoT device 103 may output a periodic or intermittent "ping" (e.g., every hour, every two hours, etc.) to RDLBS 101, and RDLBS 101 may determine the demand for sensor data based on the received pings. For example, after receiving a ping from a particular IoT device 103, RDLBS 101 may determine whether sensor data should be requested from the device based on one or more suitable factors (e.g., age or recency of last received sensor data from the particular IoT device 103, sensor type(s) associated with IoT device 103, priority of IoT device 103, etc.).

As another example, RDLBS 101 may determine that network load associated with IoT devices 103-1 and/or 103-2 is relatively high (e.g., exceeds a threshold measure of load), and/or may determine that network load associated with IoT device 103-3 is relatively low (e.g., is below a threshold measure of load and/or is lower than network load associated with IoT devices 103-1 and/or 103-2). For example, RDLBS 101 may be communicatively coupled to one or more devices or systems that monitor, receive, and/or provide information indicating network load associated with one or more networks to which IoT devices 103-1, 103-2, and/or 103-3 are communicatively coupled. Such devices or systems may provide the network load information to RDLBS 101 via an API, a Service Capability Exposure Function ("SCEF"), a Network Exposure Function ("NEF"), and/or one or more other suitable devices or systems.

Accordingly, RDLBS 101 may output (at 106) a request for sensor data to IoT device 103-3. In some embodiments, the request may indicate the time of the last sensor data received from IoT device 103-3 (e.g., time $T_3$). In some embodiments, the request may further specify a maximum data size for the requested sensor data. For example, the maximum data size may be specified in terms of quantity of sensor readings (e.g., where a particular "reading" includes a timestamp or other indicator of collection time, as well as one or more measured or sensed values). As another example, the maximum data size may be specified in terms of maximum amount of data (e.g., quantity of bits, bytes, kilobytes, etc.). In some embodiments, the maximum data size may be specified in some other suitable manner.

In some embodiments, the request (at 106) may include and/or may take the form of an instance of an object (e.g., a JavaScript Object Notation ("JSON") object or other suitable object) with a set of parameters. For example, the object may include a first parameter indicating the time of the last received data and may include a second parameter indicating a maximum data size for the data to be returned to RDLBS 101. In some embodiments, the request and/or object may include one or more other parameters, such as an indication of a particular sensor or type of data (e.g., in situations where IoT device 103 includes multiple sensors and/or collects different types of sensor data) or other suitable parameters.

IoT device 103-3 may identify (at 108) sensor data (e.g., sensor readings) collected after the indicated time (e.g., time $T_3$ in this example). IoT device 103-3 may, for example, identify one or more sensor readings that are associated with a timestamp that is after the time indicated in the request. In some embodiments, IoT device 103-3 may identify a subset of readings collected after the indicated time, in situations where IoT device 103-3 has collected multiple readings after the indicated time and the multiple readings have a higher data size than the maximum data size indicated in the request.

IoT device 103-3 may provide (at 110) the requested sensor data to RDLBS 101. In situations where the amount of sensor data collected by IoT device 103 exceeds the maximum data size indicated in the request, IoT device 103-3 may provide sensor data that has a size (e.g., quantity of readings, amount of data, etc.) that is equal to or less than the maximum data size.

RDLBS 101 may update (at 112) sensor data associated with IoT device 103-3 based on the received (at 110) sensor data. For example, RDLBS 101 may modify data structure 105 to reflect a last timestamp associated with the received (at 110) sensor data associated with IoT device 103-3. RDLBS 101 may also update one or more records, databases, data structures, etc. that store sensor data associated with IoT device 103-3 and/or one or more other IoT devices. In some embodiments, RDLBS 101 may modify a schedule, interval, and/or other manner in which RDLBS 101 selects an IoT device 103 to send sensor data requests to, and/or when such requests should be sent to one or more IoT devices 103. Such modifications may be based on, for example, an amount of sensor data received from IoT device 103-3, values of sensor readings associated with such sensor data, and/or other factors.

For example, in situations where the amount of sensor data from IoT device 103-3 is equal to, or is within a threshold range of, the maximum data size, RDLBS 101 may determine that IoT device 103-3 is associated with a relatively high priority for a subsequent request and/or that sensor data should be requested again from IoT device 103-3 relatively shortly. If, on the other hand, the amount of sensor data from IoT device 103-3 is less than, or is at least a threshold difference from, the maximum data size, RDLBS 101 may determine that IoT device 103-3 is associated with a relatively low priority for a subsequent request and/or that sensor data should not be requested again from IoT device 103-3 relatively shortly. The former situation may arise when, for example, IoT device 103-3 has collected and is storing more sensor data than is being requested (at 106). Such a scenario may arise when RDLBS 101 has requested sensor data from IoT device 103-3 in the past, but IoT device 103-3 has not received the request due to a network outage or other transmission issue. As another example, such a scenario may arise when IoT device 103-3 has received previous requests and has responded with requested sensor data, but RDLBS 101 has not received the sensor data due to a network outage or other transmission issue. In these situations, IoT device 103-3 may have collected a relatively large amount of sensor data relative to the maximum data size indicated in the request (at 106), and the provided (at 110) sensor data therefore is, or is relatively close to, the maximum data size. Thus, when receiving sensor data that is or is relatively close to the maximum data size, RDLBS 101 may determine that IoT device 103-3 is likely to have more sensor data available and may output another request (e.g., in a prioritized manner with respect to other IoT devices 103) for sensor data collected by IoT device 103-3.

Figure 2A:
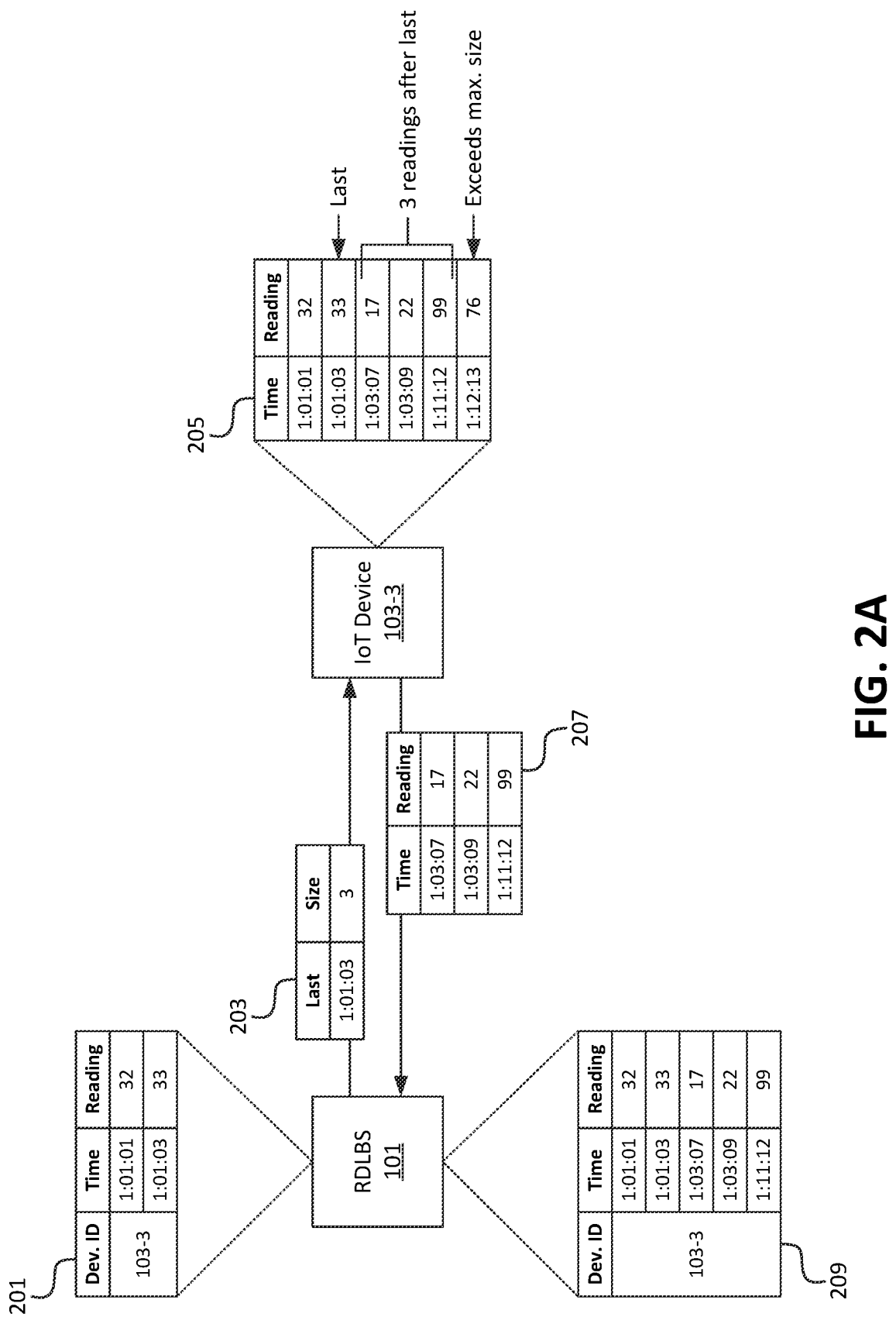
FIGS. 2A and 2B illustrate an example of monitoring a particular device in accordance with some embodiments.
Figure 2B:
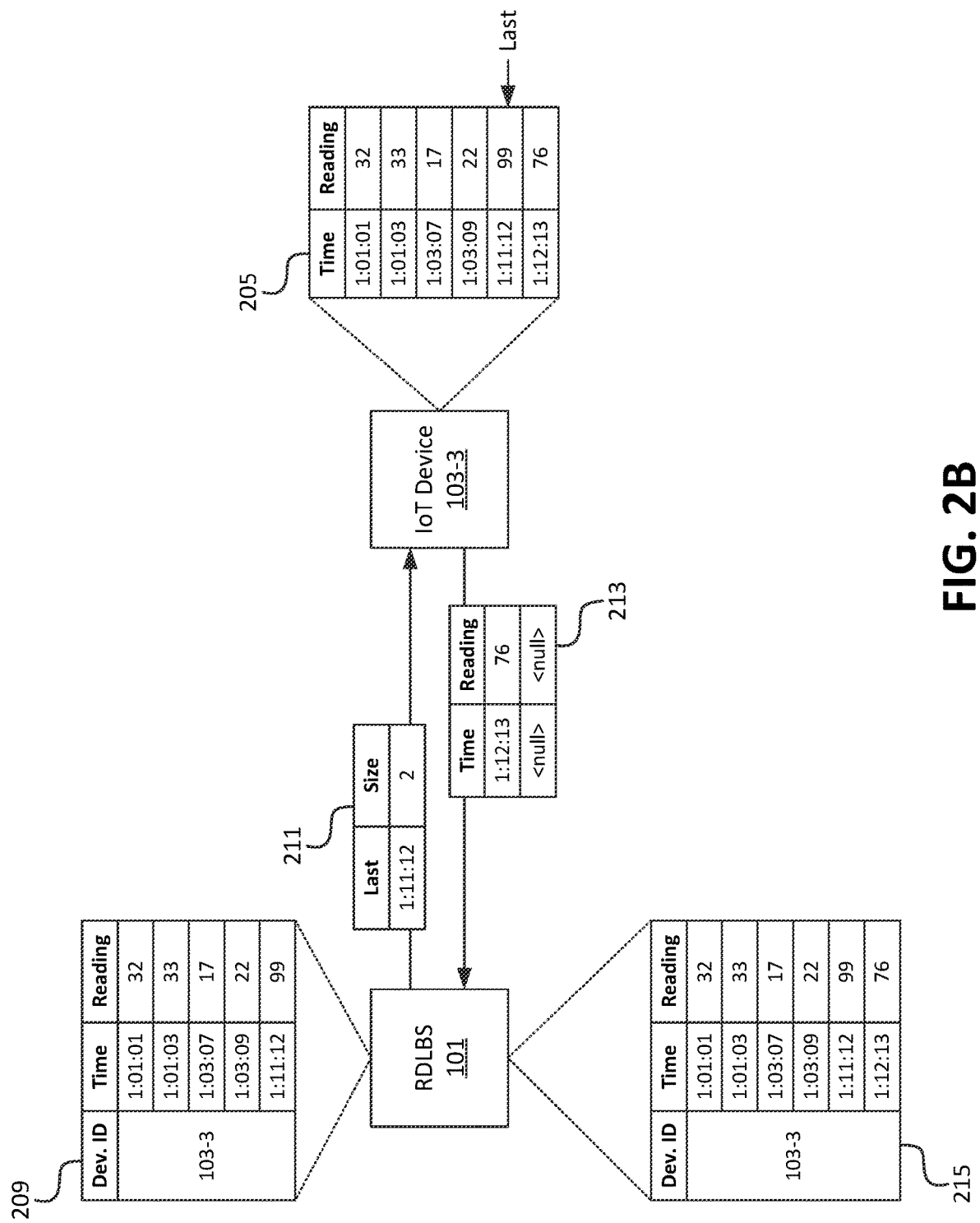

FIG. 2A illustrates an example of such a situation. As shown, RDLBS 101 may maintain data structure 201 that includes sensor data readings associated with (e.g., received from) IoT device 103-3. RDLBS 101 may store multiple instances of data structure 201 for multiple IoT devices 103. In some embodiments, received sensor readings from multiple IoT devices 103 may be stored in some other manner than the example data structure 201 of FIG. 2. In particular, for example, data structure 201 may reflect that readings with values "32" and "33" have been collected by IoT device 103-3 at 1:01:01 and at 1:01:03, respectively. These values are provided as example values, and in practice, the values may be other values. In some embodiments, sensor reading values may be or may include letters, words, strings, etc. in addition to or in lieu of numbers. In some embodiments, the readings may be raw values collected by IoT device 103-3, and/or may be derived values (e.g., scores, averages, medians, etc.) computed by IoT device 103-3, RDLBS 101, and/or some other device or system.

As noted above, at some point, RDLBS 101 may determine a demand for additional sensor data from IoT device 103-3 and may provide a request, including data structure 203, to IoT device 103-3. In some embodiments, the information included in data structure 203 may be provided to IoT device 103-3 in some other manner, such as an instance of an object and/or some other type of protocol or message. In this example, data structure 203 may indicate that the last collected data associated with IoT device 103-3, stored by RDLBS 101, was collected at 1:01:03. Data structure 203 may also indicate a maximum size of "3" for the requested sensor data. The maximum size in this example may refer to a quantity of sensor data readings. RDLBS 101 may determine the maximum size based on one or more factors, such as an amount of network load or congestion associated with a network to which RDLBS 101 is communicatively coupled, an amount of network load or congestion associated with a network to which IoT device 103-3 is communicatively coupled, a quantity of IoT devices 103 with which RDLBS 101 communicates (e.g., to receive sensor data readings from IoT devices 103), and/or other factors.

In some embodiments, the maximum data size may be based on a device type, group, category, sensor type, network type, and/or one or more other attributes of IoT device 103-3. For example, RDLBS 101 may indicate a higher maximum data size for IoT devices 103 that are associated with a "first responder" category or group than for IoT devices 103 that are not associated with such category or group. As another example, RDLBS 101 may indicate a higher maximum data size for IoT devices 103 that are communicatively coupled to a particular type of network (e.g., a Fifth Generation ("5G") radio access network ("RAN")) than a different type of network (e.g., a Long-Term Evolution ("LTE") RAN). As another example, RDLBS 101 may indicate a higher maximum data size for IoT devices 103 that include a particular type of sensor (e.g., a Light Detection and Ranging ("LIDAR") sensor, an accelerometer, etc.) than for IoT devices 103 that do not include the particular type of sensor.

As further shown, IoT device 103-3 may maintain data structure 205, which may store sensor data collected by IoT device 103-3. For example, data structure 205 may include the same sensor data readings (e.g., 32 and 33 for times 1:01:01 and 1:01:03, respectively) stored by RDLBS 101 in data structure 201. For example, data structure 201 may have received these sensor data readings at some prior time, such as prior to outputting a request including data structure 203 to IoT device 103-3. Data structure 205 may also include additional sensor data readings, including the values 17, 22, 99, 76, and associated timestamps. Based on receiving the request including data structure 203, IoT device 103-3 may identify that the sensor data reading of 33 is associated with the time included in data structure 203, and may accordingly identify the sensor data readings including the values 17, 22, and 99 as the three (e.g., the maximum data size) sensor data readings after (e.g., immediately after) the indicated last received sensor data reading. In this example, the sensor data reading of 76 may also have been collected after the indicated last received sensor data reading, but may be the fourth sensor data reading and therefore may not be included in a response from IoT device 103-3 based on exceeding the indicated maximum data size.

IoT device 103-3 may accordingly output a response including data structure 207 to RDLBS 101. The response may include an instance of an object (e.g., a JSON object or some other suitable object), one or more messages, or other suitable communications. In some embodiments, the response may include the information included in example data structure 207, but arranged in a manner different from the example shown in FIG. 2A. As shown, data structure 207 may include some of the sensor data readings stored in data structure 205. In particular, data structure 207 may include the three sensor data readings (e.g., with values 17, 22, and 99) that were collected after the indicated last received sensor data. RDLBS 101 may receive the response (e.g., including data structure 207 and/or some or all of the information therein) and may update data structure 201. For example, data structure 209 may include the information included in data structure 201 as well as the information included in the response from IoT device 103-3 (e.g., included in data structure 207).

As shown in FIG. 2B, RDLBS 101 may again determine a demand for sensor data from IoT device 103-3 at some time after receiving the response including data structure 207. For example, as discussed above, RDLBS 101 may determine the demand based on the received sensor data being of the maximum size. In some embodiments, RDLBS 101 may further determine the demand based on the received sensor data being of the maximum size and also within a threshold time window (e.g., within a ten-minute time window). Additionally, or alternatively, RDLBS 101 may further determine the demand based on the last received sensor data reading having a time that is at least a threshold amount older than a present time. For example, the threshold amount being exceeded may suggest that the sensor data indicated in data structure 207 is relatively old, and that IoT device 103-3 may have newer sensor data available.

RDLBS 101 may accordingly output a subsequent request for sensor data from IoT device 103-3. The request may include data structure 211 or some other suitable arrangement of information. Data structure 211 may indicate that the collection time associated with the last received sensor data was 1:11:12. Data structure 211 may further indicate that the maximum data size for a response to this request is two. For example, RDLBS 101 may request a different maximum data size (e.g., compared to the request in the example of FIG. 2A) based on one or more suitable factors described above, such as network load associated with IoT device 103-3 and/or RDLBS 101, a priority associated with IoT device 103-3, a position in a queue of IoT device 103-3 relative to one or more other IoT devices 103, etc.

IoT device 103-3 may identify that data structure 205 includes one sensor data reading (e.g., including the value 76) that is after the indicated last received sensor data reading, and may provide this sensor data reading to RDLBS 101 in response to the request. The response may include data structure 213 or some other suitable arrangement of information. The response may include the single sensor data reading (e.g., a value of 76 with a timestamp of 1:12:13) collected by IoT device 103-3 after the last indicated sensor data reading, as specified in the request. In some embodiments, the response may include an indication (e.g., "null" or some other indication) that although the maximum data size of the request was two, only one sensor data reading is being returned to RDLBS 101. Accordingly, RDLBS 101 may determine that sensor data associated with IoT device 103-3 is up-to-date, and may de-prioritize IoT device 103-3 with respect to one or more other IoT devices 103 when requesting subsequent updates (e.g., to allow other IoT devices 103 to "catch up" in situations where the other IoT devices 103 have sensor data readings that have not yet been provided to RDLBS 101).

Based on receiving the sensor data reading indicated in the response, RDLBS 101 may modify data structure 209. For example, modified data structure 215 includes the sensor data readings of data structure 209 as well as the sensor data readings in the response from IoT device 103-3 (e.g., indicated in data structure 213).

Figure 3:
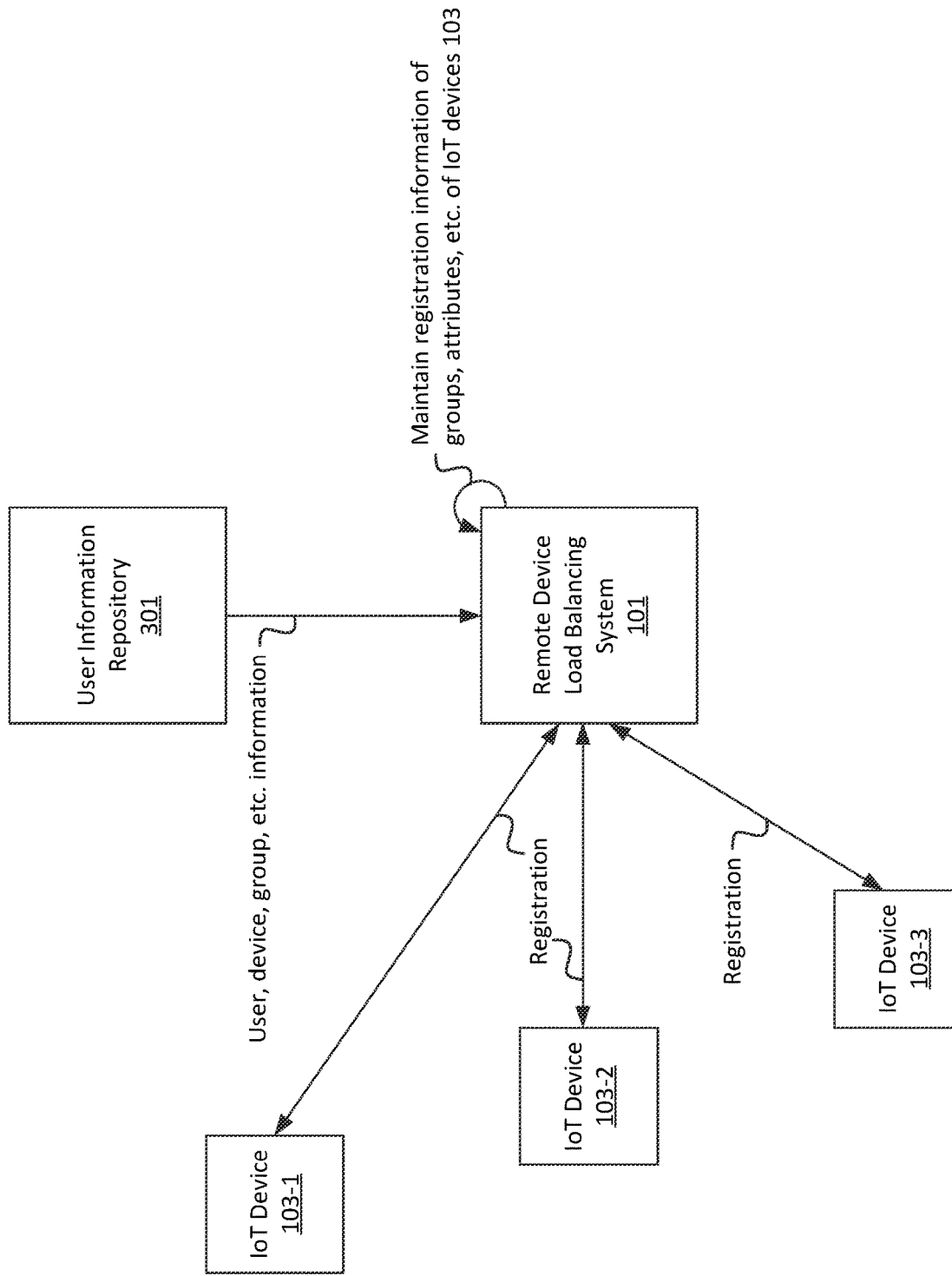
FIG. 3 illustrates an example registration procedure in accordance with some embodiments.

FIG. 3 illustrates an example registration procedure that may be performed by RDLBS 101 with respect to one or more IoT devices 103. As shown, for example, IoT devices 103-1, 103-2, and 103-3 may register with RDLBS 101. For example, RDLBS 101 may offer a web portal, an API, or other suitable communication pathway via which IoT devices 103-1, 103-2, and 103-3 may register with RDLBS 101. Additionally, or alternatively, RDLBS 101 may receive registration information from an administrator or operator associated with IoT devices 103-1, 103-2, and 103-3 may register with RDLBS 101 and/or one or more networks. In some embodiments, RDLBS 101 may receive information regarding IoT devices 103-1, 103-2, and 103-3 from some other device or system, such as User Information Repository ("UIR") 301. For example, RDLBS 101 may receive (e.g., from IoT devices 103-1, 103-2, and 103-3 and/or from UIR 301) information regarding device types, groups, categories, users, user groups, etc. associated with IoT devices 103-1, 103-2, and 103-3. In some embodiments, RDLBS 101 may receive (e.g., from IoT devices 103-1, 103-2, and 103-3 and/or from UIR 301) information regarding Quality of Service ("QoS") levels, Service Level Agreements ("SLAs"), etc. associated IoT devices 103-1, 103-2, and 103-3. In some embodiments, RDLBS 101 may receive attribute information associated with IoT devices 103-1, 103-2, and 103-3, such as device type, sensor type, and/or other attributes associated with IoT devices 103-1, 103-2, and 103-3.

In some embodiments, RDLBS 101 may receive (e.g., on an ongoing basis) information regarding one or more networks to which RDLBS 101 and/or IoT devices 103-1, 103-2, and 103-3 are connected. The information regarding the one or more networks may include network or RAN type, load information (e.g., quantity of connected UEs, percentage of used or available bandwidth or other capacity, etc.), performance information (e.g., measures of latency, throughput, jitter, etc.), and/or other suitable network information. In some embodiments, RDLBS 101 may receive other types of information from UIR 301, IoT devices 103, and/or other devices or systems. As noted above, RDLBS 101 may utilize such information as a factor in determining when to request sensor data from IoT devices 103, which IoT devices 103 to request sensor data from, and/or an amount of sensor data to request from IoT devices 103.

Figure 4A:
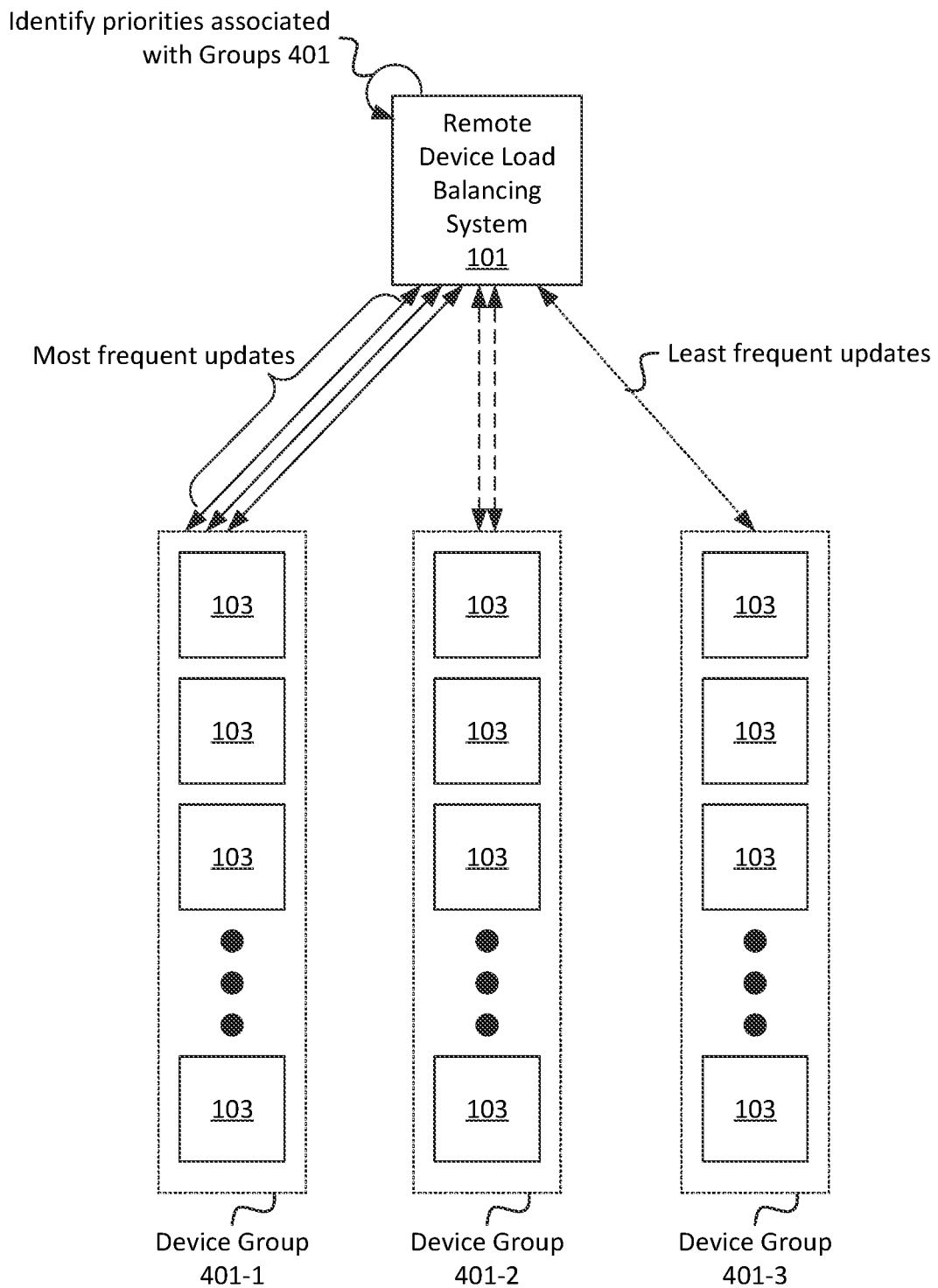
FIGS. 4A and 4B illustrate an example of prioritizing and/or de-prioritizing particular devices or sets of devices in a monitoring procedure of some embodiments.

As shown in FIG. 4A, for example, RDLBS 101 may identify multiple device groups 401-1, 401-2, and 401-3 associated with respective IoT devices 103. As one example, device groups 401-1, 401-2, and 401-3 may be associated with different networks, RANs, and/or geographical locations. As another example, device groups 401-1, 401-2, and 401-3 may be associated with different categories, such as "first responder," "enterprise device," "autonomous vehicle," or the like. In some embodiments, device groups 401-1, 401-2, and 401-3 may be associated with different types of groups or categories. RDLBS 101 may identify IoT devices 103 associated with respective groups 401 based on a registration procedure or other suitable procedure.

RDLBS 101 may identify respective priorities associated with device groups 401-1, 401-2, and 401-3 based on one or more factors, as discussed above. For example, RDLBS 101 may identify that device group 401-1 is a "first responder" group and therefore should be monitored more frequently than other groups. As another example, RDLBS 101 may identify that device group 401-1 includes IoT devices 103 that are connected to a 5G RAN, and that device group 401-2 and 401-3 include IoT devices 103 that are connected to one or more LTE RANs. In some embodiments, RDLBS 101 may determine the respective priorities of device groups 401-1, 401-2, and 401-3 based on one or more other factors, as discussed above. Accordingly, RDLBS 101 may monitor IoT devices 103 of device group 401-1 most frequently (e.g., may output requests for sensor data from device group 401-1 more frequently than device groups 401-2 and 401-3), and may monitor IoT devices 103 of device group 401-3 least frequently relative to device groups 401-1 and 401-2.

Figure 4B:
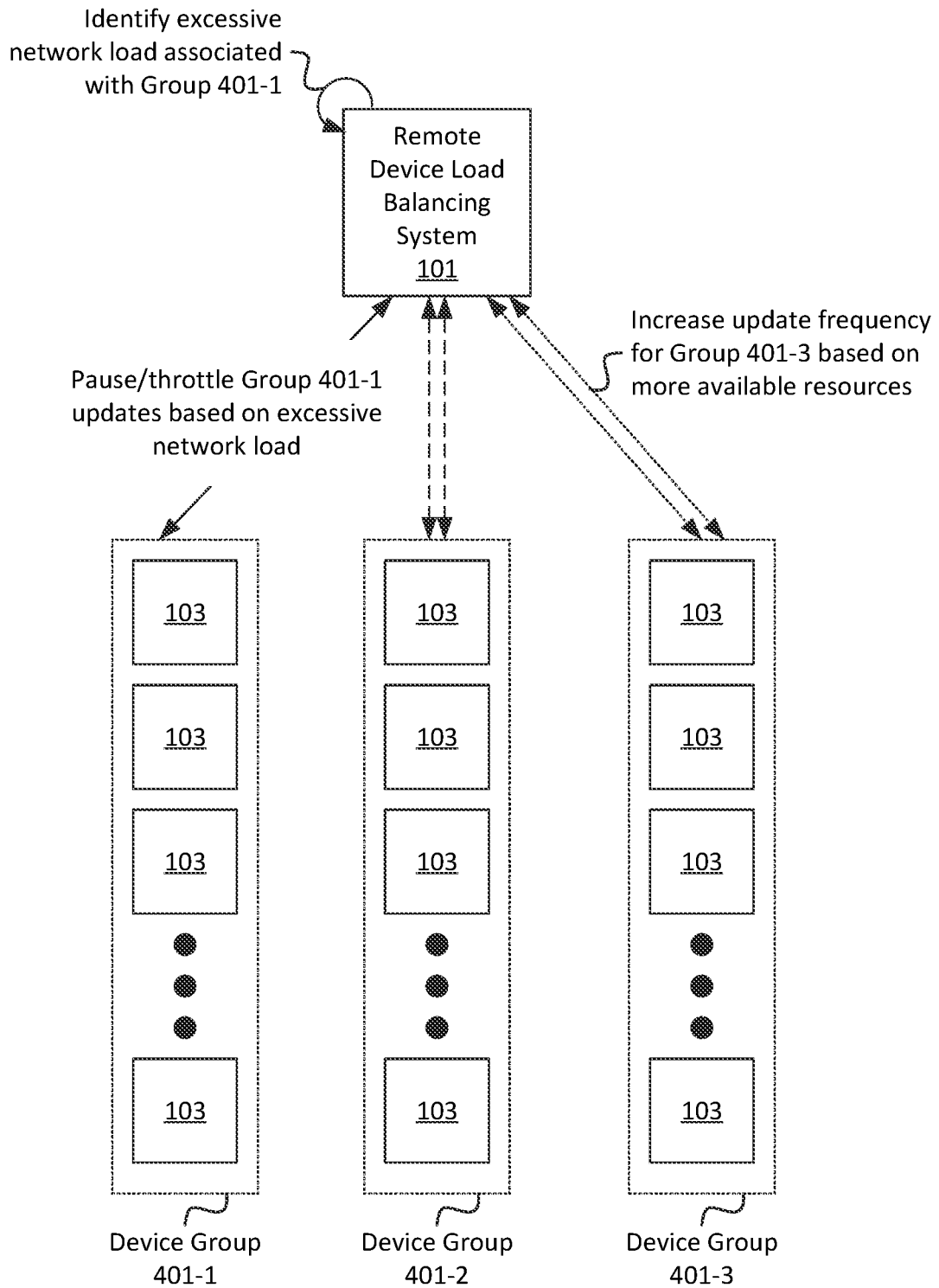

As shown in FIG. 4B, RDLBS 101 may identify that the priority of device group 401-1 has changed relative to device groups 401-2 and/or device group 401-3, and/or that device group 401-1 should be monitored less frequently than in the example of FIG. 4A. For example, RDLBS 101 may determine that network load associated with device group 401-1 exceeds a threshold measure of load, that network load associated with device group 401-1 has increased over time, that network load associated with device group 401-1 has increased relative to network load of device groups 401-2 and/or 401-3, etc. As another example, RDLBS 101 may determine that sensor data readings from IoT devices 103 of device group 401-1 are relatively up-to-date, while sensor data readings from IoT devices 103 of device group 401-3 are relatively old.

As another example, RDLBS 101 may determine that demand for sensor readings from device group 401-1 has decreased and/or that demand for sensor readings from device group 401-3 has increased. For example, RDLBS 101 may determine that one or more IoT devices 103 associated with device group 401-3 are located in a geographical region in which an emergency or disaster (e.g., a natural disaster, a vehicle crash, etc.) has occurred. As another example, RDLBS 101 may determine that one or more IoT devices 103 associated with device group 401-3 are located in a geographical region associated with a scheduled event that is taking place or is scheduled to take place within a threshold amount of time, such as a sporting event, a concert, etc. In some embodiments, RDLBS 101 may determine that a frequency of monitoring of IoT devices 103 of device group 401-1 should be reduced and/or that a frequency of monitoring of IoT devices 103 of device group 401-3 should be increased based on one or more other factors.

In some embodiments, RDLBS 101 may determine that the frequency of updates from device group 401-3 should be increased based on RDLBS 101 having more resources (e.g., processing resources, network resources, storage resources, etc.) available due to reducing the frequency of monitoring of device group 401-1. That is, RDLBS 101 may determine that the frequency of monitoring of IoT devices 103 of device group 401-3 should be increased independent of metrics, attributes, etc. associated with device group 401-3.

Accordingly, RDLBS 101 may pause, throttle, and/or otherwise reduce the frequency of monitoring of IoT devices 103 of device group 401-1 and may increase the frequency of monitoring of IoT devices 103 of device group 401-3. For example, RDLBS 101 may output fewer requests for sensor data from IoT devices 103 of device group 401-1 over a time period (e.g., fewer than a previous time period), and/or may output more requests from sensor data from IoT devices 103 of device group 401-3 over the same time period.

Figure 5:
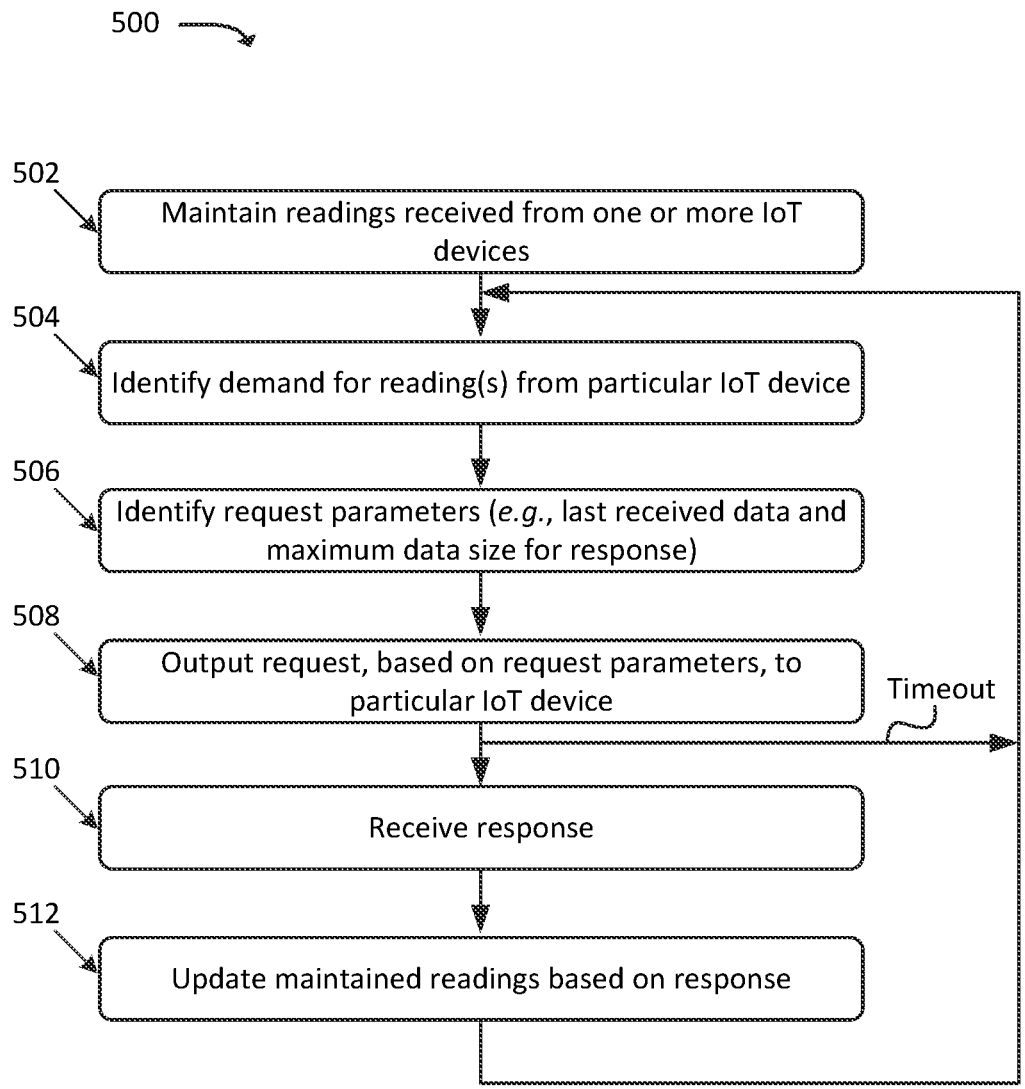
FIG. 5 illustrates an example process for monitoring one or more devices in accordance with some embodiments.

FIG. 5 illustrates an example process 500 for monitoring one or more IoT devices 103. In some embodiments, some or all of process 500 may be performed by RDLBS 101. In some embodiments, one or more other devices may perform some or all of process 500 in concert with, and/or in lieu of, RDLBS 101.

As shown, process 500 may include maintaining (at 502) readings received from one or more IoT devices 103. For example, as discussed above, RDLBS 101 may receive one or more readings, such as sensor data readings, from one or more IoT devices 103. Additionally, or alternatively, RDLBS 101 and/or some other device or system may receive sensor data readings collected by IoT devices 103 from some other device or system (e.g., an application server that is in communication with IoT devices 103). In some embodiments, such readings may have been received via one or more prior iterations of some or all of process 500. The readings may include time information and one or more values, such as raw values, computed values, derived values, or the like. The time information for a given reading may indicate a time at which such reading was collected or otherwise determined by a particular IoT device 103 with which the reading is associated. The one or more values may include and/or may be based on sensor data collected via one or more sensors or other input devices associated with IoT device 103.

Process 500 may further include identifying (at 504) a demand for readings from a particular IoT device 103 of the one or more IoT devices 103. For example, as discussed above, RDLBS 101 may determine the demand based on one or more factors, such as a time that has passed since the last received reading from the particular IoT device 103, a network load associated with the particular IoT device 103 and/or one or more other IoT devices 103, a group or category associated with the particular IoT device 103, and/or one or more other factors described above. In some embodiments, RDLBS 101 may rank, prioritize, queue, etc. the one or more IoT devices 103 and may identify a demand for readings from the one or more IoT devices 103 in a sequence that is based on the ranking, prioritizing, queuing, etc. of the one or more IoT devices 103. For example, RDLBS 101 may identify a demand for readings from a higher ranked IoT device 103 before identifying a demand for readings from a lower ranked IoT device 103. In some embodiments, RDLBS 101 may identify (at 504) a demand for readings from IoT device 103 based on receiving a "ping" or other type of message from IoT device 103.

Process 500 may additionally include identifying request parameters (at 506) associated with the particular IoT device 103, such as a latest time at which readings, associated with the particular IoT device 103 and maintained by RDLBS 101, were collected. The request parameters may, in some embodiments, include a maximum data size for a response to the request. As discussed above, the maximum data size may be determined based on one or more factors, such as a measure of network load associated with RDLBS 101 and/or the particular IoT device 103, a priority or category associated with the particular IoT device 103, and/or one or more other factors.

Process 500 may also include outputting (at 508) a request, based on the request parameters, to the particular IoT device 103. For example, RDLBS 101 may indicate the latest time at which readings associated with the particular IoT device 103 were collected and/or the maximum data size for a response to the request. In some embodiments, the request may take the form of, may include, and/or may be included in, an object such as a JSON object.

Process 500 may further include receiving (at 510) a response to the request. For example, the particular IoT device 103 may have identified one or more readings collected by IoT device 103 and not yet provided to RDLBS 101. Such one or more readings may be identified based on identifying readings that have been collected after the time indicated in the request. A quantity of the one or more readings may be, or may be fewer than, the indicated maximum data size. Additionally, or alternatively, IoT device 103 may identify an amount of data (e.g., an amount of bits, bytes, kilobytes, etc.) collected after the time indicated in the request. As such, the response may include readings that were collected after the indicated time, and may also be (or may be smaller than) the indicated maximum size.

In some embodiments, in situations where RDLBS 101 does not receive (at 510) the response within a threshold amount of time (e.g., a "timeout") after outputting (at 508) the request, RDLBS 101 may identify (at 504) a demand for readings from IoT device 103, and may output (at a subsequent iteration of 508) a subsequent request. In some embodiments, the subsequent request may have different parameters than the previous request, such as a higher maximum data size.

Process 500 may additionally include updating (at 512) maintained readings based on the response. For example, RDLBS 101 may update one or more data structures to reflect the received readings. In some embodiments, RDLBS 101 may update a record indicating the last received data for the particular IoT device 103 based on a latest time indicated in the readings included in the response from the particular IoT device 103.

As further shown, some or all of process 500 may be repeated iteratively and/or performed in an ongoing basis, in order to continue to monitor the particular IoT device 103 and/or one or more other IoT devices 103. In some embodiments, multiple instances of process 500 may be performed concurrently in a synchronous or asynchronous manner, such that multiple different IoT devices 103 may be independently and dynamically monitored.

Figure 6:
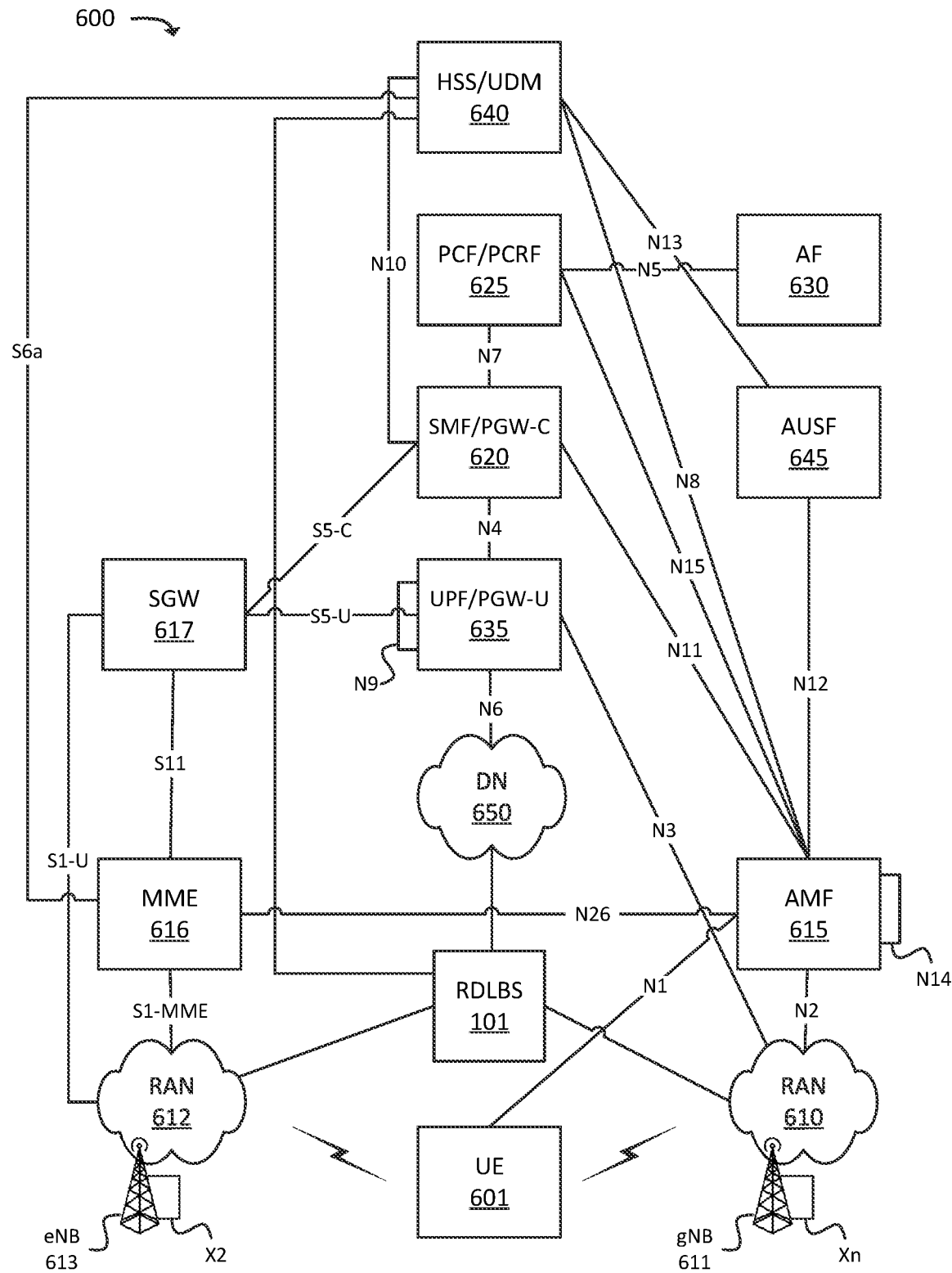
FIG. 6 illustrates an example environment in which one or more embodiments, described herein, may be implemented.

FIG. 6 illustrates an example environment 600, in which one or more embodiments may be implemented. In some embodiments, environment 600 may correspond to a 5G network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as RDLBS 101.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), or another type of mobile computation and communication device. UE 601 may send traffic to and/or receive traffic (e.g., user plane traffic) from DN 650 via RAN 610, RAN 612, and/or UPF/PGW-U 635. In some embodiments, IoT device 103 described herein may include, may be implemented by, and/or may be communicatively coupled to one or more UEs 601.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 615, and/or one or more other devices or networks) and may communicate the traffic to UE 601 via the air interface.

RAN 612 may be, or may include, a LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 615 may include one or more devices, systems, Virtualized Network Functions ("VNFs"), Cloud-Native Network Functions ("CNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices).

In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, CNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601. In some embodiments, UIR 301 may include, may be implemented by, and/or may be communicatively coupled to HSS/UDM 640.

DN 650 may include one or more wired and/or wireless networks. For example, DN 650 may include an Internet Protocol IP-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

Figure 7:
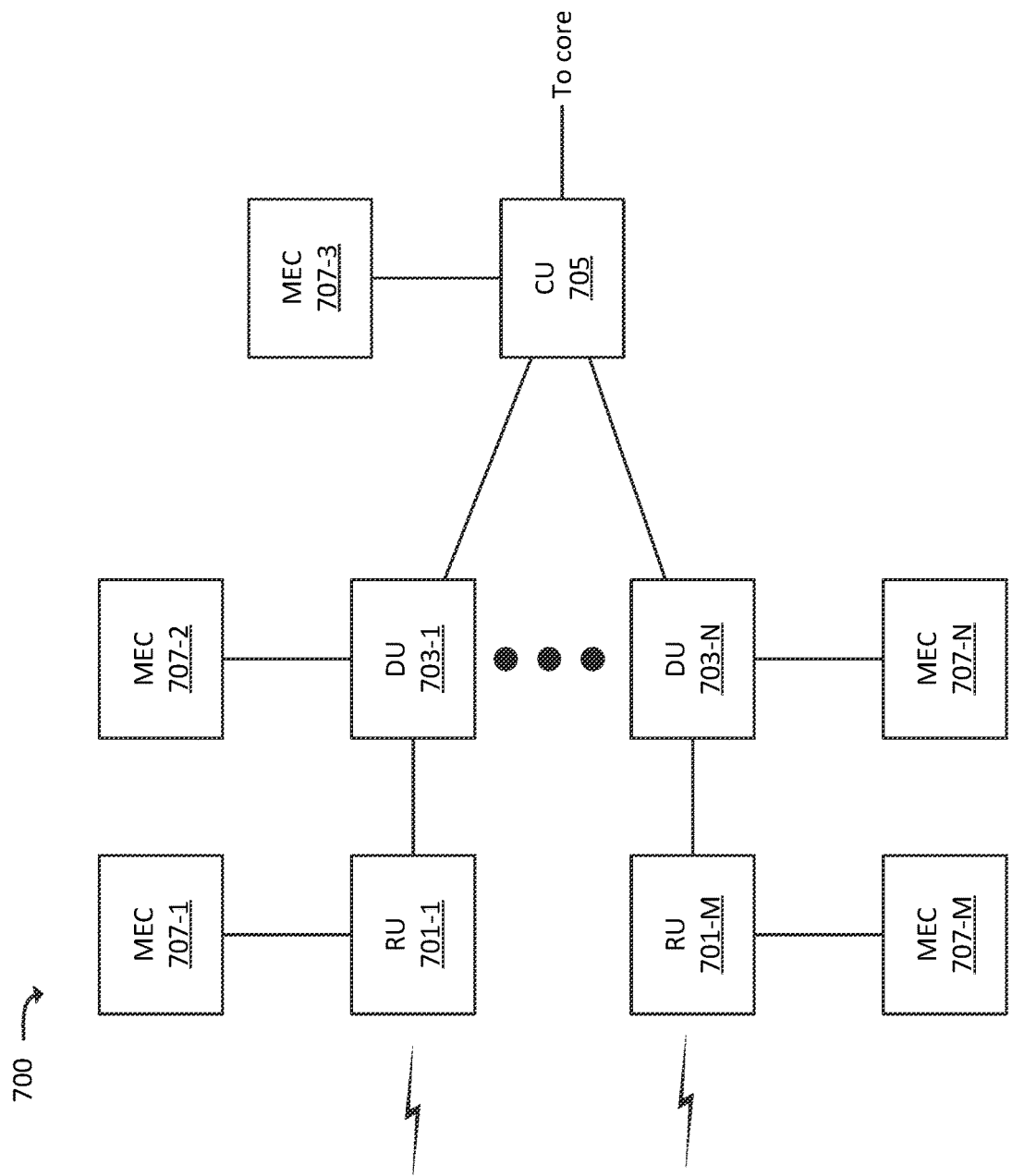
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network)

for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more Multi-Access/Mobile Edge Computing ("MEC") devices, referred to sometimes herein simply as "MECs" 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701.

For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network. In some embodiments, MEC 707 may include, and/or may implement, some or all of the functionality described above with respect to RDLBS 101.

Figure 8:
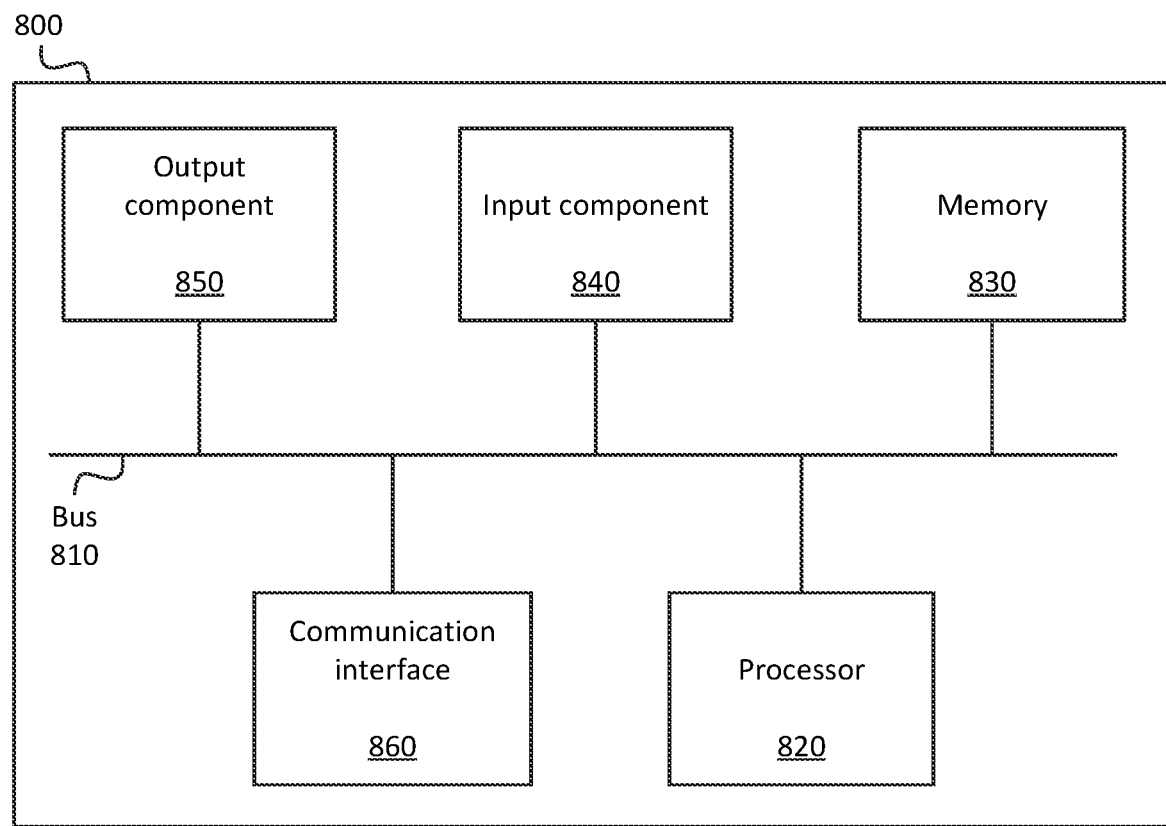
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4B), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain a set of readings received from a plurality of devices, wherein each reading is associated with a particular time;
identify, based on times associated with readings received from a plurality of device of the plurality of devices, a latest reading associated with the particular device;
output a request to the particular device, wherein the request includes:
a first indication of a time associated with the latest reading associated with the particular device, and
a second indication of a maximum quantity of readings to include in a response to the request,
wherein the particular device outputs a response to the request including one or more readings collected by the particular device after the indicated time associated with the latest reading associated with the particular device, wherein a quantity of the one or more readings included in the response is within the maximum quantity of readings indicated in the request; and
update the set of readings based on the one or more readings indicated in the response from the particular device.

2. The device of claim 1, wherein the particular device is a first device, wherein the request is a first request, wherein the one or more processors are further configured to:
determine that a data size of the response is within a threshold range of a maximum data size;
prioritize the first device over a second device based on determining that the data size of the response is within the threshold range of the maximum data size; and
output a second request, based on the prioritizing, to the first device before outputting a third request to a second device of the plurality of devices.

3. The device of claim 2, wherein the maximum data size includes a maximum amount of data.

4. The device of claim 1, wherein the request includes a first JavaScript Object Notation ("JSON") object, and wherein the response includes a second JSON object.

5. The device of claim 1, wherein the particular device includes one or more sensors, and wherein the readings collected by the particular device include data collected via the one or more sensors.

6. The device of claim 1, wherein the one or more are further configured to:
identify a category associated with each of the plurality of devices;
determine a priority of each device of the plurality of devices based on the category associated with each device; and
output requests for readings from the plurality of devices in a sequence that is based on the priority of each device.

7. The device of claim 1, wherein the particular device outputs only a subset of readings collected by the particular device in response to the request, wherein the particular device identifies the subset based on the first indication of the time associated with the latest reading associated with the particular device and the second indication of the maximum quantity of readings to include in the response.

8. A non-transitory computer-readable medium, storing a plurality of processor-executable instructions to:
maintain a set of readings received from a plurality of devices, wherein each reading is associated with a particular time;
identify, based on times associated with readings received from a plurality of device of the plurality of devices, a latest reading associated with the particular device;

output a request to the particular device, wherein the request includes:
  a first indication of a time associated with the latest reading associated with the particular device, and
  a second indication of a maximum quantity of readings to include in a response to the request,
  wherein the particular device outputs a response to the request including one or more readings collected by the particular device after the indicated time associated with the latest reading associated with the particular device, wherein a quantity of readings included in the response is within the maximum quantity of readings indicated in the request; and
update the set of readings based on the readings indicated in the response from the particular device.

9. The non-transitory computer-readable medium of claim 8, wherein the particular device is a first device, wherein the request is a first request, wherein the plurality of processor-executable instructions further include processor-executable instructions to:
  determine that a data size of the response is within a particular range;
  prioritize the first device over a second device based on determining that the data size of the response is within the particular range; and
  output a second request, based on the prioritizing, to the first device before outputting a third request to a second device of the plurality of devices.

10. The non-transitory computer-readable medium of claim 9, wherein the data size of the response is based on an amount of data included in the response.

11. The non-transitory computer-readable medium of claim 8, wherein the request includes a first JavaScript Object Notation ("JSON") object, and wherein the response includes a second JSON object.

12. The non-transitory computer-readable medium of claim 8, wherein the particular device includes one or more sensors, and wherein the readings collected by the particular device include data collected via the one or more sensors.

13. The non-transitory computer-readable medium of claim 8, wherein the plurality of processor-executable instructions further include processor-executable instructions to:
  identify a category associated with each of the plurality of devices;
  determine a priority of each device of the plurality of devices based on the category associated with each device; and
  output requests for readings from the plurality of devices in a sequence that is based on the priority of each device.

14. The non-transitory computer-readable medium of claim 8, wherein the particular device outputs only a subset of readings collected by the particular device in response to the request, wherein the particular device identifies the subset based on the first indication of the time associated with the latest reading associated with the particular device and the second indication of the maximum quantity of readings to include in the response.

15. A method, comprising:
  maintaining a set of readings received from a plurality of devices, wherein each reading is associated with a particular time;
  identifying, based on times associated with readings received from a plurality of device of the plurality of devices, a latest reading associated with the particular device;
  outputting a request to the particular device, wherein the request includes:
    a first indication of a time associated with the latest reading associated with the particular device, and
    a second indication of a maximum quantity of readings to include in a response to the request,
    wherein the particular device outputs a response to the request including one or more readings collected by the particular device after the indicated time associated with the latest reading associated with the particular device, wherein a quantity of readings included in the response is within the maximum quantity of readings indicated in the request; and
  updating the set of readings based on the readings indicated in the response from the particular device.

16. The method of claim 15, wherein the particular device is a first device, wherein the request is a first request, the method further comprising:
  determining that the data size of the response exceeds a threshold data size;
  prioritizing the first device over a second device based on determining that the data size of the response exceeds the threshold data size; and
  outputting a second request, based on the prioritizing, to the first device before outputting a third request to a second device of the plurality of devices.

17. The method of claim 16, wherein the threshold data size includes a threshold amount of data.

18. The method of claim 15, wherein the request includes a first JavaScript Object Notation ("JSON") object, and wherein the response includes a second JSON object.

19. The method of claim 15, wherein the particular device includes one or more sensors, and wherein the readings collected by the particular device include data collected via the one or more sensors.

20. The method of claim 15, further comprising:
  identifying a category associated with each of the plurality of devices;
  determining a priority of each device of the plurality of devices based on the category associated with each device; and
  outputting requests for readings from the plurality of devices in a sequence that is based on the priority of each device.

* * * * *